United States Patent [19]

Cavil

[11] 4,283,668
[45] Aug. 11, 1981

[54] DC MOTOR CONTROL WITH ALTERNATE ACTION SOLENOID DRIVE CIRCUIT

[75] Inventor: David T. Cavil, Menomonee Falls, Wis.

[73] Assignee: Outboard Marine Corporation, Waukegan, Ill.

[21] Appl. No.: 10,030

[22] Filed: Feb. 7, 1979

[51] Int. Cl.³ .............................................. H02P 3/00
[52] U.S. Cl. .................................... 318/549; 318/139
[58] Field of Search .................... 318/549, 139; 361/29

[56] References Cited

U.S. PATENT DOCUMENTS

| 3,649,896 | 3/1972 | Mason et al. | 318/387 |
| 4,125,885 | 11/1978 | Lowther et al. | 361/29 |
| 4,131,833 | 12/1978 | McAuliffe et al. | 318/440 |

*Primary Examiner*—David Smith, Jr.
*Attorney, Agent, or Firm*—Michael, Best & Friedrich

[57] ABSTRACT

Disclosed herein is an alternate action solenoid drive circuit adapted for connection to a DC source having first and second power terminals and which can be incorporated in a DC motor control for a vehicle, also disclosed herein. The drive circuit comprises an actuator switch including go and stop terminals, and an actuator switch operable in response to movement of a foot pedal for alternately moving between a go position connecting the go terminal to the first power terminal and a stop or off position connecting the stop terminal to the first power terminal. The drive circuit includes a thyristor having an anode connected to the go terminal, and a cathode and a gate, a sequencing solenoid including a solenoid coil having one end connected to the cathode and an opposite end connected to the second power terminal, and a parallel RC network connected in series between the stop terminal and the thyristor gate for applying a trigger pulse to the gate when the actuator switch is moved to the off position. The drive circuit also includes a control circuit including a transistor having a collector connected to the anode, an emitter connected to the cathode, and a base connected to the solenoid coil for receiving transient current from the solenoid coil so as to render the transistor conductive for shunting the thyristor to prevent current flow through the thyristor in response to one of the trigger pulses applied to the gate alternate times the actuator is moved to the off position. The control circuit is also connected in circuit with the thyristor for allowing a holding current to flow through the thyristor in response to one of the trigger pulses applied to the gate the other alternate times the actuator switch is moved to the off position, and also for alowing the holding current to increase to an energizing current which flows through the thyristor and the solenoid coil to energize the solenoid alternate times the actuator switch moves to the go position.

17 Claims, 3 Drawing Figures

Fig. 2

DC MOTOR CONTROL WITH ALTERNATE ACTION SOLENOID DRIVE CIRCUIT

BACKGROUND OF THE INVENTION

The invention relates to vehicles driven by direct current electric motors, and more particularly, to motor controls for energizing or connecting a DC motor to a battery bank. Still more particularly, the invention relates to an alternate action solenoid drive circuit for a DC motor control which is operable so that a DC motor is alternately energized from opposite ends of a battery bank.

Attention is directed to U.S. Pat. No. 4,131,833, issued Dec. 26, 1978, and to pending United States patent application entitled Direct Current Motor Control with Protective Solenoid Latching Ser. No. 967,611, Dec. 8, 1978, now U.S. Pat. No. 4,214,288, issued July 22, 1981 assigned to the same assignee as this application.

SUMMARY OF THE INVENTION

The invention provides an alternate action solenoid drive circuit adapted for connection to a DC source having first and second power terminals. The circuit comprises actuator switch means including go and stop terminals, and an actuator switch connected to the first power terminal and selectively operable for alternately moving between a go position connecting the go terminal to the first power terminal, and a stop position connecting the stop or off terminal to the first power terminal, first semiconductor switching means having a first terminal connected to the go terminal, and having a second terminal and a third terminal, a solenoid including a solenoid coil connected in series relation with the first semiconductor switching means between the first and second power terminals, first circuit means connected to and between the stop terminal and the third terminal for applying a trigger pulse to the third terminal when the actuator switch is moved to the off position, and second circuit means connected in circuit with the first semiconductor switching means and the solenoid coil for preventing current flow through the first semiconductor switching means in response to one of the trigger pulses alternate times the actuator is moved to the off position, and for allowing a holding current to flow through the thyristor in response to one of the trigger pulses applied to the third terminal the other alternate times the actuator switch is moved to the off position, the second circuit means also for allowing the holding current to increase to an energizing current which flows through the thyristor and the solenoid coil to energize the solenoid alternate times the actuator switch moves to the go position.

In accordance with an embodiment of the invention, the second circuit means comprises second semiconductor switching means connected to the solenoid coil for responding to transient current flow in the solenoid coil so as to be rendered operative to prevent current flow through the first semiconductor switching means in response to one of the trigger pulses the alternate times the actuator is moved to the off position.

Also in accordance with an embodiment of the invention, the first semiconductor switching means comprises a thyristor and the first circuit means comprises a parallel RC network connected in series between the stop terminal and the thyristor gate.

Also in accordance with an embodiment of the invention, the second circuit means comprises first resistance means connected to the first power terminal and the thyristor for allowing flow of the holding current through the thyristor.

Also in accordance with an embodiment of the invention, the second circuit means comprises a transistor including a collector and an emitter each respectively connected to one of the first and second thyristor terminals, and also including a base connected to the solenoid coil for responding to transient current flow in the solenoid coil so as to render the transistor conductive for shunting the thyristor first and second terminals to prevent current flow through the thyristor in response to one of the trigger pulses the alternate times the actuator switch is moved to the off position.

Also in accordance with an embodiment of the invention, the second circuit means comprises first resistance means connected to the first power terminal and to the thyristor and the transistor for allowing flow of the holding current through the thyristor, and for allowing flow of current through the transistor when the base responds to the transient current flow to render the transistor conductive.

Also in accordance with an embodiment of the invention, the second circuit means comprises a free wheeling diode connected across the solenoid coil and having one of an anode and a cathode connected to the transistor base. The second circuit means also preferably comprises second resistance means connected in circuit with the transistor for reducing the gain of the transistor.

The invention also provides an alternate action solenoid drive circuit adapted for connection to a DC source having first and second power terminals, the circuit comprising actuator switch means including go and stop terminals, and an actuator switch connected to the first power terminal and selectively operable for alternately moving between a go position connecting the go terminal to the first power terminal, and a stop or off position connecting the stop terminal to the first power terminal, first semiconductor switching means having a first terminal connected to the go terminal, and having a second terminal and a third terminal, a solenoid including a solenoid coil connected in series relation with the first semiconductor switching means between the first and second power terminals, first circuit means connected to and between the stop terminal and the third terminal for applying a trigger pulse to the third terminal when the actuator switch is moved to the off position, and second circuit means connected in circuit with the first semiconductor switching means and the solenoid coil for preventing current flow through the first semiconductor switching means in response to one of the trigger pulses alternate times the actuator is moved to the off position.

The invention also provides a direct current motor control for a direct current motor comprising a bank of series connected batteries, and switch means for electrically disconnecting and connecting the bank to the motor so that successive energizations of the motor are alternately from opposite ends of the battery bank, the switch means including an alternate action solenoid drive circuit as described above. The invention also provides a vehicle including such a direct current motor control.

One of the principal features of the invention is the provision of an alterante action solenoid drive circuit which energizes a solenoid alternate times an actuator switch moves to a go position.

Another of the principal features of the invention is the provision of such an alternate action solenoid driver which utilizes a relatively small number of semiconductor components and which is economical to manufacture and reliable in operation.

Another of the principal features of the invention is a DC motor control for a DC motor which includes a battery bank and switch means incorporating such an alternate action solenoid drive circuit and which is operative so that the DC motor is alternately energized from opposite ends of the battery bank.

Other features and advantages of the embodiments of the invention will become known by reference to the following general description, claims and appended drawings.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Figure 1:
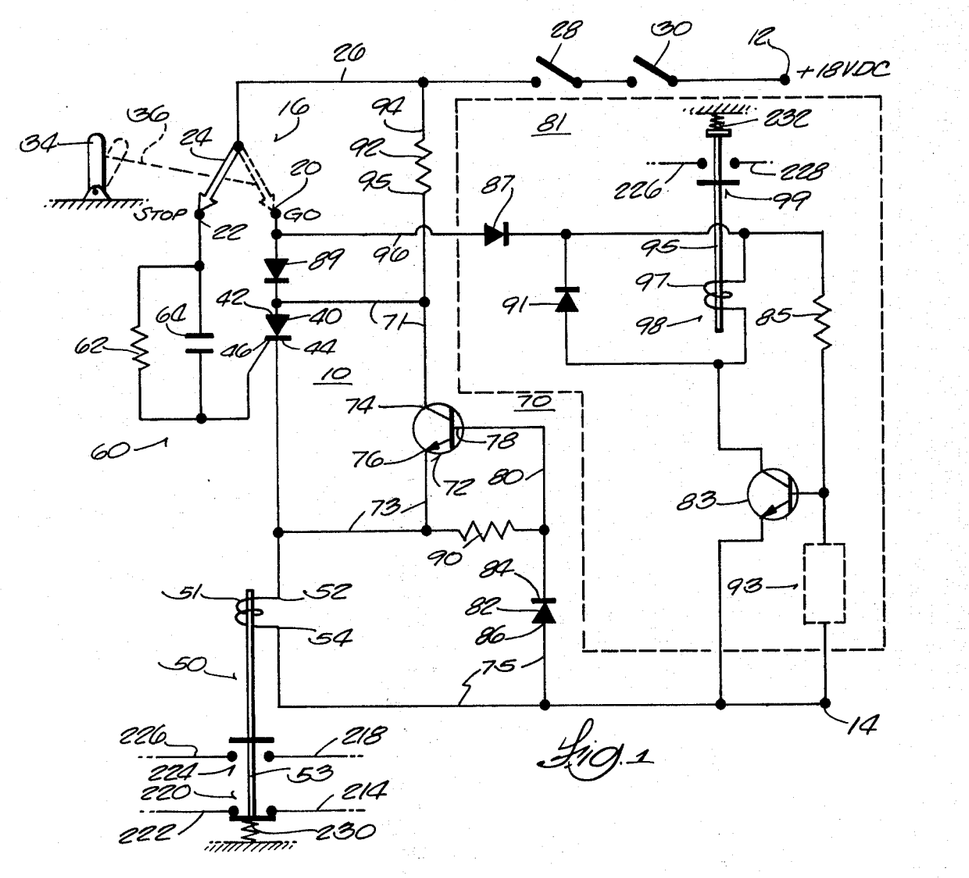
FIG. 1 is a schematic view of an alternate action solenoid drive circuit embodying various features of the invention.
Figure 2:
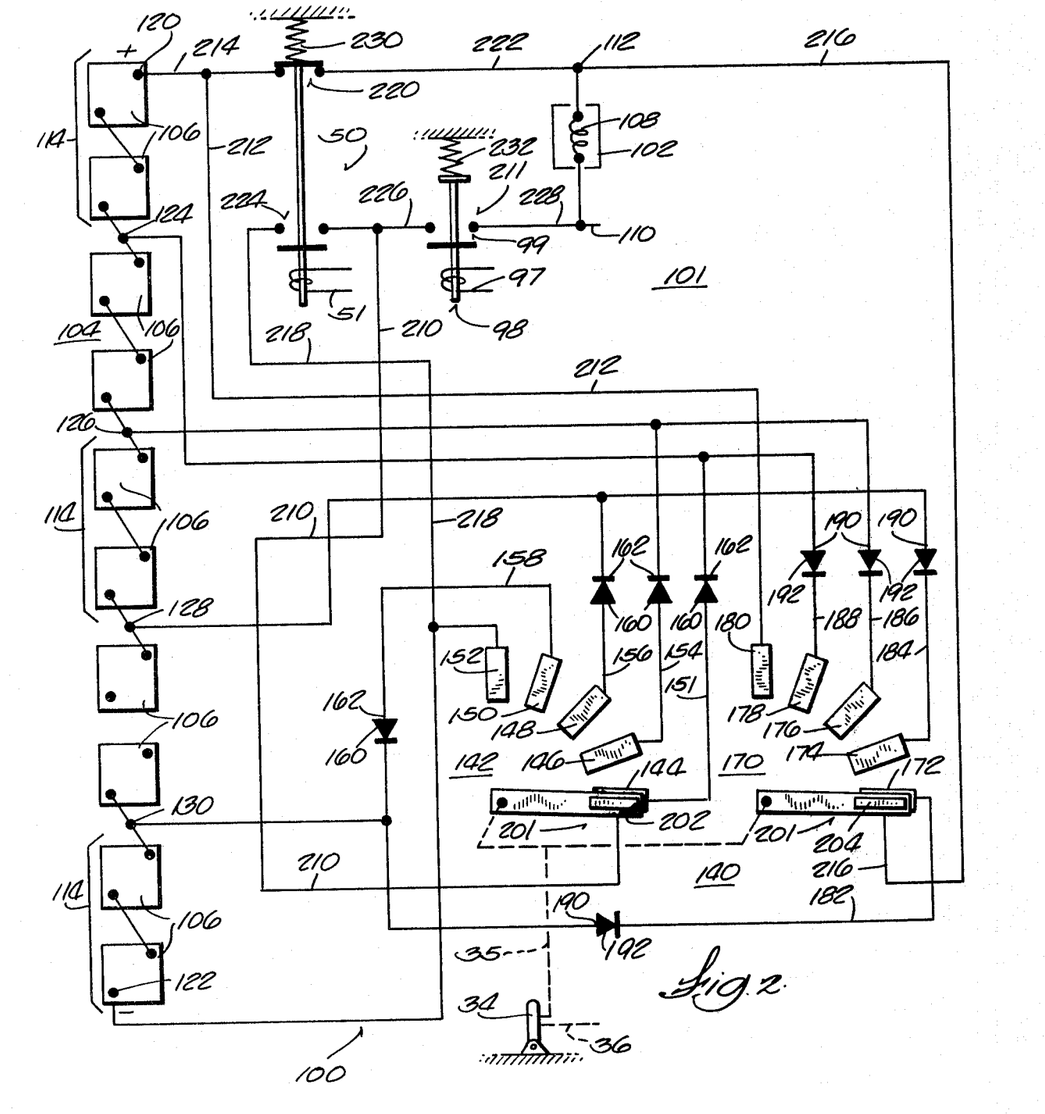
FIG. 2 is a schematic view of a direct current motor control partially illustrating the solenoid drive circuit of FIG. 1 which is incorporated therein, the motor control embodying various features of the invention.
Figure 3:
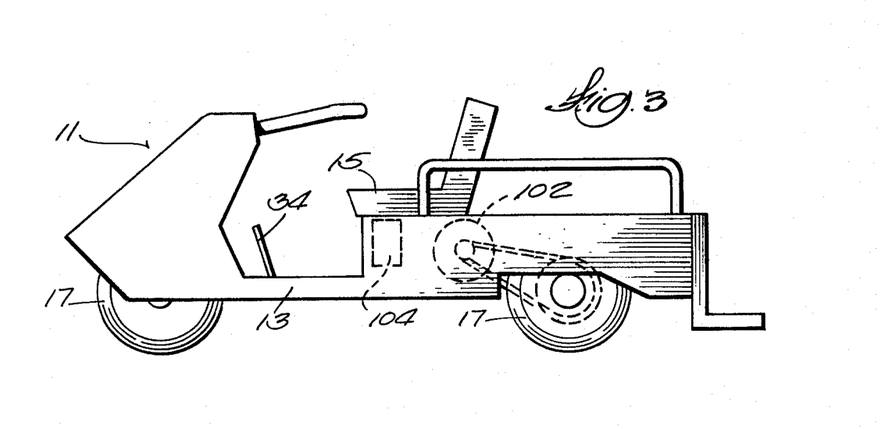
FIG. 3 is a schematic view of a vehicle which includes the DC motor control of FIG. 2 and which embodies various features of the invention.

Shown in FIG. 1 is an alternate action solenoid drive conduit 10 which can be incorporated, for example, in a DC motor control 100 for a DC motor 102 such as shown in FIG. 2 (described below), and which is adapted for connection to a DC source having first and second power terminals, designated 12 and 14, respectively. The terminals 12 and 14 can be connected or tapped into, for example, a series connected battery bank 104 (see FIG. 2) so that the voltage supplied across the terminals 12 and 14 is generally constant, for example, 18 volts as shown. The motor 102 can be utilized to drive a vehicle 11 (see FIG. 3), the vehicle conventionally including a frame 13 which supports a seat 15, which is supported on a set of wheels 17, and which carries the battery bank 104 and an accelerator pedal 34.

The solenoid driver circuit 10 includes actuator switch means (diagrammatically shown), generally designated 16, preferably including go and stop terminals 20 and 22, respectively, and an actuator blade or actuator switch 24 connected to the first power terminal 12 by a lead 26, which lead preferably includes an ignition switch 28 and a seat switch 30 as shown. The actuator switch 24 is connected, for example, to an accelerator or foot pedal 34 by a suitable linkage 36, shown schematically by dotted line, and is operable for alternately moving between a go position (shown with phantom lines) connecting the go terminal 20 to the first power terminal 12, and a stop or off position (shown with solid lines) connecting the stop terminal 22 to the first power terminal 12. The actuator switch means 16 is suitably connected to pedal 34 so that operator movement of the pedal from an initial or normal rest position (shown with solid lines) causes the actuator switch 24 to move from the stop position to the go position, and return of the pedal 34 to the initial position causes the actuator switch 24 to move back to the stop position.

The solenoid drive circuit 10 includes semiconductor switching means, preferably in the form of thyristor 40, having an anode 42 connected to the go terminal 20 and having a cathode 44 and a gate 46. The circuit 10 also preferably includes a double-pole, single-throw sequencing solenoid 50 (diagrammatically shown) made up of a solenoid coil 51 and a plunger 53 including switches generally designated 220 and 224. The solenoid coil 51 includes one end 52 connected to the cathode 44 of thyristor 40 and an opposite end 54 connected to the second power terminal 14. The solenoid plunger 53 is biased by a spring 230 so that the solenoid switch 220 is normally closed to connect lines 222 and 214 of motor control 100 and the solenoid switch 224 is normally biased open to disconnect lines 226 and 218 of motor control 100 (see FIG. 2). When the thyristor 40 is rendered conductive and a current of sufficient magnitude, i.e., an energizing current, flows through the thyristor and solenoid coil, the solenoid 50 is energized, causing the plunger 53 to move and overcome the bias of spring 230 so that switch 224 closes and switch 220 opens. When the energizing current flow is interrupted and the solenoid 50 is deenergized, the bias of spring 230 closes switch 220 and opens switch 224. A further description of the purpose and operation of the sequencing solenoid 50, when included in the motor control 100 as shown in FIG. 2, will be discussed later below.

The drive circuit 10 also includes trigger circuit means connected to and between the stop terminal 22 and the thyristor gate 46 for applying a trigger pulse to the gate 46, i.e., a current pulse of sufficient magnitude to render thyristor 40 conductive, assuming the anode-cathode junction of the thyristor is properly biased, when the actuator switch 24 is moved to the stop position. While various trigger circuit means might be utilized, as shown in FIG. 1, such means preferable comprises an RC network, generally designated 60, and made up of a resistor 62 and a capacitor 64 connected in parallel with each other. The RC network 60 is connected in series between the stop terminal 22 and the gate 46.

The solenoid drive circuit 10 also includes control circuit means, generally designated 70, connected in circuit with the thyristor 40 and the solenoid coil 51 for preventing current from flowing through the thyristor in response to one of the trigger pulses every alternate time the actuator switch 24 is moved to the off position, and also for allowing a holding current to flow through the thyristor in response to one of the trigger pulses applied to the gate by the RC network 60 the other alternate times the actuator switch is moved to the stop position. The control circuit means 70 also allows the holding current to increase to an energizing current which flows through the thyristor 40 and the solenoid coil 51 to energize the solenoid 50 alternate times the actuator switch moves to the go position.

While various control circuit means arrangements could be utilized, such means preferably comprises semiconductor switching means, preferably in the form of transistor 72, including a collector 74 connected through lead 71 to the anode 42 of thyristor 40, and an emitter 76 connected through lead 73 to the cathode 44 of thyristor 40. The base 78 is connected through lead 80 to the solenoid coil 51 and to power terminal 14. Specifically, the lead 80 is connected to a cathode 84 of a free wheeling diode 82 and the anode 86 of diode 82 is connected to power terminal 14 and the solenoid coil 51 by lead 75. The base 78 and the cathode 84 of diode 82 are also connected to the emitter 76 through resistance means or resistor 90 connected to leads 80 and 73 as shown for reducing the gain of the transistor. The control means 70 also includes another resistance means or a current limiting resistor 92 having one end 94 connected through lead 26 to the first power terminal 12, and a second end 95 connected to the collector 74 of transistor 72 and to the anode 42 of thyristor 40 by lead 71. The second resistance means or resistor 92 allows flow of holding current through the thyristor 40, and also allows flow of current through the transistor 72 when the transistor is rendered conductive.

The operation of the alternate action solenoid drive circuit 10 is as follows. Assuming the pedal 34 is moved from an initial position so that the actuator switch 24 is in the go position, and assuming thyristor 40 is conducting, the solenoid 50 is energized by an energizing current which flows from terminal 12 (assuming switches 28 and 30 are closed) through the actuator switch 24, the thyristor 40 and the solenoid coil 51 to the second power terminal 14. If the pedal 34 is released or returns to the initial position the actuator switch 24 is then returned to the stop position and the current flowing through the thyristor 40 is interrupted. A transient current flow through the solenoid coil 51 is temporarily maintained, however, due to the inductance of the coil 51. This transient current flows from the end 54 of coil 51 through diode 82, and through the parallel paths of resistor 90 and the base-emitter junction of transistor 72, and then back to end 52 of the coil 51. The resistor 90 serves to reduce the gain of transistor 72 so the the transistor circuit is not sensitive to minor variations in the solenoid current. Transistor 72 is rendered conductive in response to the transient current flow in the solenoid coil 51, i.e., in response to the transient current flow through the base-emitter junction, so that the transistor 72 is turned on by a current flow supplied through resistor 92. Thus, transistor 72 shunts thyristor 40 or holds the anode-cathode potential of thyristor 40 to a voltage below that required for the thyristor 40 to be rendered conductive in response to a trigger pulse applied to the gate 46.

At the same time, when the actuator switch 24 moves to the stop position and engages the stop terminal 22, a charging current or trigger pulse flows from terminal 12 through the actuator switch 24, the capacitor 64, the gate-cathode junction of thyristor 40, and the solenoid coil 51 to terminal 14, due to the charging of capacitor 64. Resistor 62 of the RC network 60 has a sufficiently high resistence so that the resistor cannot pass enough current by itself to render thyristor 40 conductive. The charging current of capacitor 64 is large enough, however, to constitute a trigger pulse which is applied to the gate 46 to render thyristor 40 conductive if the anode-cathode potential of thyristor 40 is of sufficient magnitude and polarity.

At this point in operation of the circuit 10, the thyristor 40 cannot conduct even though a trigger pulse is applied to gate 46 because the anode-cathode potential or voltage is held low or shunted by transistor 72 which is turned on by the transient current flow in the solenoid coil 51, as described above. The capacitor 64 becomes charged and the charging current flowing through the gate 46 diminishes so that it no longer constitutes a trigger pulse, or is no longer of sufficient magnitude to render thyristor 40 conductive, before the transient current flowing through solenoid coil 51 decays so that the transistor 72 is no longer rendered conductive. Thereafter, the transient current does decay and the circuit 10 is left so that neither thyristor 40 or transistor 72 are conducting, and the solenoid 50 remains deenergized.

When the pedal 34 is again moved so that actuator switch 24 is returned to the go position in engagement with the go terminal 20, the solenoid 50 can not be energized because thyristor 40 is nonconducting. Capacitor 64 discharges through resistor 62, but nothing else happens.

When the pedal 34 is released and the actuator switch 24 is again moved to the stop position in engagement with the stop terminal 22, capacitor 64 again charges and results in a trigger pulse being applied to gate 46. This time, the trigger pulse renders thyristor 40 conductive because the solenoid 50 was not energized and hence, there is no transient current flow to render transistor 72 conductive to shunt the thyristor. When the trigger pulse gates or renders thyristor 40 conductive, a holding current flows through the thyristor, but the magnitude of the holding current is less than the magnitude of the energizing current that is required to energize the solenoid 50. The magnitude of this holding current is determined or limited by resistor 92 which is connected to supply the current to the anode of thyristor 40 from terminal 12. This holding current continues to flow through thyristor 40 until the pedal 34 is moved and the actuator switch 24 is again placed in the go position in engagement with the go terminal 20. The actuator switch 24 shunts resistor 92 so that the holding current increases to an energizing current, i.e., a current that is of sufficient magnitude to render the thyristor 40 fully conductive and to energize the solenoid 50. At the same time actuator switch 24 moves to the go position, the capacitor 64 discharges through resistor 62, so that when the actuator switch 24 moves to the stop position, a charging current or trigger pulse is again applied to the gate of the thyristor.

At this point, the thyristor 40 is conducting and the solenoid 50 is energized so that the circuit 10 is now in the state as originally described. The described operation of the circuit repeats so that the solenoid 50 is energized every other or alternate time the actuator switch 24 is placed in the go position.

As shown in FIG. 1, the alternate action solenoid drive circuit 10 can be connected to or include a main solenoid drive circuit, generally designated 81. The drive circuit 81 includes a main solenoid 98 (diagrammatically shown) made up of a solenoid coil 97 and a plunger 95 including a switch, generally designated 99, which is selectively closed to connected lines 226 and 228 of the motor control 100 (see FIG. 2) and which is biased open by a spring 232 when the solenoid 98 is deenergized. The flow of energizing current through the main solenoid 97, and hence closing of solenoid switch 99, is regulated by solenoid driver transistor 83 which is biased by resistor 85 and rendered conductive or connected to power terminal 112 through operation of the actuator switch 24.

More particularly, when movement of the pedal 34 causes actuator switch 24 to move to the go position, the main solenoid drive circuit 81 is connected to the positive terminal 12 by a line 96 which is connected to circuit 81 and to the go terminal 20 as shown. Assuming the solenoid driver transistor 83 is rendered conductive, the driver transistor 83 allows an energizing current to flow through the main solenoid coil 97 so that solenoid 98 is energized and plunger 95 overcomes the bias of spring 232 so that the normally open solenoid switch 99 closes. When the actuator switch 24 is moved to the stop position, the driver circuit 81 is disconnected from power terminal 112 and the solenoid 98 is deenergized so that the solenoid switch 99 is again biased open.

In order to prevent transient currents in the main solenoid coil and in the sequencing solenoid coil from interfering with energizing of the main and sequencing solenoids, a diode 87 is preferably connected in line 96, and a diode 89 is preferably connected between line 96 and the thyristor anode 42 as shown. Also, the main solenoid driver circuit 81 preferably includes a free wheeling diode 91 connected across the solenoid coil 97.

If desired, the conduction of the solenoid driver transistor 83 can also be controlled by protective solenoid latching circuitry, diagrammatically shown by box 93, (shown in phantom lines), and connected between the base of transistor 83 and power terminal 14. This protective circuitry 93 can operate to shunt the base and emitter terminals of transistor 83 to prevent conduction of transistor 83 and reenergizing of the main solenoid 98, for example, if the voltage across the open main solenoid switch 99 exceeds a predetermined upper limit. A main solenoid driver circuit including such protective circuitry is disclosed in the earlier referenced U.S. patent application entitled Direct Current Motor Control With Protective Solenoid Latching Ser. No. 967,611, Dec. 8, 1978, U.S. Pat. No. 4,214,288, issued July 22, 1981 and such protective circuitry does not form a part of the invention disclosed herein, and hence, will not be further described.

The solenoid drive circuit 10 is incorporated in switch means, generally designated 101, included in the motor control 100 shown in FIG. 2, which switch means is operative so that the DC motor 102 is alternately energized, upon successive movements of the actuator switch 24 to the go position, from opposite ends of the battery bank 104.

More particularly, turning to the schematic view of FIG. 2, the DC motor control 100 is provided with switch means 101 for energizing the direct current motor 102 from the bank 104 of series connected batteries 106 in such a manner as to more evenly discharge the batteries in the bank. To this end, the control 100 is operative to energize the motor 102 at increasing levels of potential and is further operable so that successive energizations of the motor from zero potential involves alternate connection of the motor to one or more of the batteries 106 from the opposite ends of the battery bank 104. The direct current motor 102 can include both an armature winding and a field winding or can be a permanent magnet motor including only a single winding. In FIG. 2, the motor 102 is schematically illustrated as including a winding 108 having opposite end terminals 110 and 112, which terminals are referred to as negative terminal 110 and positive terminal 112, although it is to be understood that the polarity of the terminals could be reversed, for example, during reverse motor operation.

Any suitable number of batteries 106 can be employed. In the illustrated construction ten six volt batteries are shown. The batteries 106 are arranged in five sub-banks 114 each including two of the series connected batteries 106. The battery bank 104 includes a positive end terminal 120, a negative end terminal 122, and intermediate terminals 124, 126, 128, and 130 located between each of the sub-banks 114 or at 12 volt potential differences from each other. The intermediate terminals could be one of the adjacently connected battery terminals. Of course, other size batteries and other potential differences between the intermediate terminals can be employed.

Included in the switch means 101 of the control 100 is a speed control switch, generally designated 140, including a first arcuately arranged plurality of contacts 142 including a series of first, second, third, and fourth contacts 144, 146, 148, and 150, respectively, and a last or end contact 152. The first, second, third and fourth contacts 144, 146, 148, and 150 are respectively connected to the first, second, third, and fourth intermediate terminals 124, 126, 128, and 130 by respective leads 151, 154, 156, and 158 which respectively include diodes 160 arranged with the cathodes 162 thereof connected to the intermediate terminals.

The speed control switch 140 further includes a second arcuately arranged plurality of contacts 170 including a second series of first, second, third, and fourth contacts 172, 174, 176, and 178, respectively, and a second last or end contact 180. The first, second, third and fourth contacts 172, 174, 176, and 178 are respectively connected to the fourth, third, second, and first intermediate terminals 130, 128, 126, and 124 by respective leads, 182, 184, 186 and 188 which respectively include diodes 192 arranged with their anodes 190 connected to the intermediate terminals.

The speed control switch 140 further includes an actuator 201 connected by a suitable linkage 35, shown in dotted line, to the foot pedal 34. Movement of the pedal 34 operates the actuator 201 as well as the actuator switch 24 (see FIG. 1). In the schematic illustration of FIG. 2, the actuator 201 is illustrated twice for the sake of clarity, but it can be one member or structure, and has operatively connected thereto first and second switch contacts 202 and 204, respectively, which, in response to movement of the foot pedal 34, move from a disconnect position and are respectively successively engageable with the first and second plurality of contacts 142 and 170. Specifically, as the pedal 34 is gradually moved or displaced a greater distance, the actuator 201 is moved from the disconnect position and the switch contacts 202 and 204 are successively engaged with the first, second, third, fourth, and last or end contacts of the first and second pluralities of contacts 142 and 174.

As shown in FIG. 2, the last or end contact 152 of the first plurality of contacts 142 is connected by line 218 to the negative end terminal 122 of the battery bank 104 and to the left side or contact of the switch 224 of the sequencing solenoid 50. The first switch contact 202 of the actuator 201 is connected by line 210 to line 226, which is connected to the right side of the switch 224 and to the left side of the switch 99 of the main solenoid 98.

The last or end contact 180 of the second plurality of contacts 170 is connected by line 212 to line 214, which is connected to the positive terminal 120 of the battery bank and to the left side of the sequencing solenoid switch 220. The second switch contact 204 of the actuator 201 is connected by line 216 to the positive terminal 112 of the motor 102 and to the right side of solenoid switch 220. A line 228 connects the right side of the main solenoid switch 99 to the negative terminal 110 of the motor 102.

The speed control switch 140 and the bank 104 of batteries 106 are connected to the direct current motor 102 by the double-pole, single-throw sequencing solenoid 50 and the main solenoid 98. Specifically, the sequencing and main solenoids are operated by the alternate action solenoid drive circuit 10 (partially shown in FIG. 2) included in the switch means 101 of the control 100 so as to connect the motor 102 alternately through the first and second pluralities of contacts 142 and 170 to alternately energize the motor 102 from opposite ends of the battery bank 104 upon successive movements of the actuator switch 24 to the go position.

More particularly, assuming the same sequence of operation of the drive circuit 10 as was described above, when the foot pedal 34 is moved to displace the actuator switch 24 to the go position, the sequencing solenoid 50 and main solenoid 98 are energized so that switches 224 and 99 overcome the bias of springs 230 and 232, respectively, and are closed, while switch 220 is opened. This results in connecting the negative terminal 110 of the motor 102 to the negative terminal 122 of the battery bank through line 228, closed switch 99, line 226, closed switch 224, and line 218. The other terminal 112 of the motor is connected by line 216 to the second switch contact 204 of the actuator 201 which, in response to movement of the foot pedal 34, is first connected to the first contact 172 of the second plurality of contacts 170. Contact 172 is connected to the intermediate terminal 130 of battery bank 104 by line 182 so that the motor 102 is supplied with a positive potential of 12 volts across its terminals 112 and 110 from the sub-bank 114 at the negative terminal end of the battery bank.

Further movement or depression of the foot pedal 34 results in the second switch contact 204 successively engaging the second, third, fourth, and last contacts, 174, 176, 178, 180, respectively, of the second plurality of contacts 170 so that the terminal 112 of the motor is successively connected to intermediate terminals 128, 126, 124, and the positive terminal 120 of the battery bank 104, to successively increase the potential across the motor. Consequently, when the solenoid drive circuit 10 energizes the sequencing and main solenoids, and the solenoid switches 224 and 99 are closed (while the solenoid switch 220 is open), the actuator 201 can be operated so as to move the second switch contact 204 relative to the plurality of contacts 170 so that the motor 102 will be operated through one of the plurality of contacts 170 at a desired potential level, and, accordingly at a desired speed. It is to be understood that the diodes 190 connected to the plurality of contacts 170 are poled or arranged so that they allow only a positive potential to be supplied to the terminal 112 of the motor 102 during normal forward operation.

When the foot pedal 34 is released so that the actuator 201 moves to a disconnect position, (i.e., to a position where contacts 202 and 204 are not in engagement with the plurality of contacts 142 and 170) and so that the actuator switch 24 is moved to the stop position, the sequencing solenoid 50 and the main solenoid 98 are deenergized, so that the main solenoid switch 99 is biased open by spring 232 and the motor is deenergized. At the same time, the spring 230 biases the sequencing solenoid switch 224 open and closes sequencing solenoid switch 220.

As described above, when the foot pedal 34 is moved so that the actuator switch 24 is again displaced to the go position, the sequencing solenoid 50 remains deenergized so that the switch 220 remains biased closed and the switch 224 is open, although the main solenoid 98 is again energized so that switch 99 closes. This time, when the actuator 201 is moved from a disconnect position by further movement of the pedal 34, the first switch contact 202 cooperates with the first plurality of contacts 142, in a manner similar to the second switch contact 204 cooperating with the second plurality of contacts 170, so that the motor 102 will be energized from the positive terminal end of the battery bank and be operated through one of the plurality of contacts 142 at a desired potential level, and, accordingly, at a desired speed.

More particularly, when the first plurality of contacts 142 is operative to provide the potential energizing the motor, the potential is provided from the opposite or positive end of the battery bank, since the positive terminal 120 of the battery bank is now directly connected to the motor terminal 112 through line 214, closed solenoid switch 220, and line 222. The negative terminal 112 of the motor is connected through line 228, closed main solenoid switch 99, line 226 and line 210 to the first switch contact 202 of the actuator 201. Thus, as the actuator 201 is moved into successive engagement with the contacts 144, 146, 148, 150, and 152 of the first plurality of contacts 142, the negative terminal 110 of the motor is connected through these contacts to the intermediate terminals 124, 126, 128, 130 and the negative terminal 122 of the battery bank, respectively. The diodes 160, associated with the first plurality of contacts 142, are poled to allow only positive potential to be impressed at the motor terminal 112 during normal forward motor operation. Similarly, although the switch contacts 202 and 204 simultaneously respectively engage the first and second pluralities of contacts 142 and 170, the diodes 192 and 160 are poled so that only one plurality of contacts is effective at one time to connect the motor 102 to the battery bank 104.

When the foot pedal 34 is moved or released so that the actuator switch 24 moves to the stop position, and the actuator 201 is moved to the disconnect position, the main solenoid 98 is deenergized, thereby opening switch 99 and deenergizing the motor. As was described above, when the foot pedal 34 is again moved so that the actuator switch 24 is moved to the go position, the sequencing solenoid 50 is energized, thereby closing solenoid switch 224 and opening solenoid switch 220, as well as closing the main solenoid switch 99, and hence, the motor 102 is now energized through operation of the second contact 204 and the second plurality of contacts 170 as previously described.

Accordingly, whenever the actuator 201 is operated by pedal 34 so as to move the switch contacts 202 and 204 relative to the pluralities of contacts 142 and 170, the motor 102 will be operated through one of the plurality of contacts 142 and 170 at a desired speed and potential. Upon return of the actuator 201 to the disconnect position, the motor 102 is disconnected or deenergized by reason of disconnection of the switch contacts 202 and 204 from the pluralities of contacts 142 and 172 and by reason of the actuator switch moving to the stop position so that the main solenoid switch 99 is opened, thereby opening the circuit to the motor terminal 110.

More particularly, the energizing of the sequencing solenoid 50 every other or alternate time the actuator switch 24 is moved to the go position by pedal 34, results in solenoid switches 220 and 224 alternately closing with successive movements of the pedal 34 and the actuator 201 from disconnect to connect so that the first and second switch contacts 202 and 204 and the associated pluralities of contacts 142 and 170 alternately connect the motor to opposite ends of the battery. Thus power is drained from the batteries 106 in the opposite direction from that which was employed during the preceding movement of the actuator 201 from the disconnect position.

It is to be understood that the invention is not confined to the construction and arrangement of parts wherein illustrated and described, but embraces all such modified forms thereof, as comes within the scope of the following claims.

What is claimed is:

1. An alternate action solenoid drive circuit adapted for connection to a DC source having first and second power terminals, said circuit comprising actuator switch means including go and stop terminals, and an actuator switch connected to the first power terminal and selectively operable for alternately moving between a go position connecting said go terminal to the first power terminal, and an off position connecting said stop terminal to the first power terminal connected to said go terminal, and having a second terminal and a third terminal, a solenoid including a solenoid coil connected in series relation with said first semiconductor switching means between the first and second power terminals, first circuit means connected to and between said stop terminal and said third terminal for applying a trigger pulse to said third terminal when said actuator swich is moved to said off position, and second circuit means connected in circuit with said first semiconductor switching means and said solenoid coil for preventing current flow through said first semiconductor switching means in response to one of said trigger pulses alternate times said actuator is moved to said off position and for allowing a holding current flow through said first semiconductor switching means in response to one of said trigger pulses the other alternate times said actuator is moved to said off position.

2. An alternate action solenoid drive circuit adapted for connection to a DC source having first and second power terminals, said circuit comprising actuator switch means including go and stop terminals, and an actuator switch connected to the first power terminal and selectively operable for alternately moving between a go position connecting said go terminal to the first power terminal, and an off position connecting said stop terminal to the first power terminal, first semiconductor switching means having a first terminal connected to said go terminal, and having a second terminal and a third terminal, a solenoid including a solenoid coil connected in series relation with said first semiconductor switching means between the first and second power terminals, first circuit means connected to and between said stop terminal and said third terminal for applying a trigger pulse to said third terminal when said actuator switch is moved to said off position, and second circuit means connected in circuit with said first semiconductor switching means and said solenoid coil for preventing current flow through said first semiconductor switching means in response to one of said trigger pulses alternate times said actuator is moved to said off position, and for allowing a holding current to flow through said first semiconductor switching means in response to one of said trigger pulses applied to said third terminal the other alternate times said actuator switch is moved to said off position, said second circuit means also for allowing the holding current to increase to an energizing current which flows through said first semiconductor switching means and said solenoid coil to energize said solenoid alternate times said actuator switch moves to said go position.

3. An alternate action solenoid drive circuit adapted for connection to a DC source having first and second power terminals, said circuit comprising actuator switch means including go and stop terminals, and an actuator switch connected to the first power terminal and selectively operable for alternately moving between a go position connecting said go terminal to the first power terminal and an off position connecting said stop terminal to the first power terminal, a thyristor including an anode connected to said go terminal, and a cathode and a gate, a solenoid including a solenoid coil having one end connected to said cathode and an opposite end connected to the second power terminal, a parallel RC network connected in series between said stop terminal and said thyristor gate for applying a trigger pulse to said gate when said actuator switch is moved to said off position, and circuit means including a transistor having a collector connected to said anode and an emitter connected to said cathode, and also having a base connected to said solenoid coil for receiving transient current from said solenoid coil so as to render said transistor conductive for shunting said thyristor anode and cathode to prevent current flow through said thyristor in response to one of said trigger pulses applied to said gate alternate times said actuator is moved to said off position, said circuit means also connected in circuit with said thyristor for allowing a holding current to flow through said thyristor in response to one of said trigger pulses applied to said gate the other alternate times said actuator switch is moved to said off position, said circuit means also for allowing said holding current to increase to an energizing current which flows through said thyristor and said solenoid coil to energize said solenoid alternate times said actuator switch moves to said go position.

4. A circuit in accordance with claim 3 wherein said circuit means further comprises first resistance means having one end connected to the first power terminal and an opposite end connected to said thyristor anode and said transistor collector for allowing flow of said holding current through said thyristor, and for allowing flow of current through said transistor when said base receives said transient current, a free wheeling diode connected across said solenoid coil and having an anode connected to the second power terminal and a cathode connected to said transistor base, and second resistance means having one end connected to said transistor base and the other end connected to said transistor emitter for reducing the gain of said transistor.

5. A direct current motor control for a direct current motor, said motor control comprising a bank of series connected batteries, and switch means for electrically disconnecting and connecting said bank to the motor so that successive energizations of the motor are alternately from opposite ends of said battery bank, said switch means including alternate action solenoid drive circuit means adapted for connection to a DC source having first and second power terminals, said solenoid drive circuit means including actuator switch means including go and stop terminals, and an actuator switch connected to the first power terminal and selectively operable for alternately moving between a go position connecting said go terminal to the first power terminal, and an off position connecting said stop terminal to the first power terminal, first semiconductor switching means having a first terminal connected to said go terminal, and having a second terminal and a third terminal, a solenoid including a solenoid coil connected in series relation with said first semiconductor switching means between the first and second power terminals, first circuit means connected to and between said stop terminal and said third terminal for applying a trigger pulse to said third terminal when said actuator switch is moved to said off position, and second circuit means connected in circuit with said first semiconductor switching means and said solenoid coil for preventing current flow through said first semiconductor switching means in response to one of said trigger pulses alternate times said actuator is moved to said off position, and for allowing a holding current to flow through said first semiconductor switching means in response to one of said trigger pulses applied to said third terminal the other alternate times said actuator switch is moved to said off position, said second circuit means also for allowing said holding current to increase to an energizing current which flows through said first semiconductor switching means and said solenoid coil to energize said solenoid alternate times said actuator switch moves to said go position.

6. A direct current motor control for a direct current motor, said motor control comprising a bank of series connected batteries, and switch means for electrically disconnecting and connecting said bank to said motor so that successive energizations of said motor are alternately from opposite ends of said battery bank, said switch means including alternate action solenoid drive circuit means adapted for connection to a DC source having first and second power terminals, said solenoid drive circuit means including actuator switch means including go and stop terminals, and an actuator switch connected to the first power terminal and selectively operable for alternately moving between a go position connecting said go terminal to the first power terminal and an off position connecting said stop terminal to the first power terminal, a thyristor including an anode connected to said go terminal, and a cathode and a gate, a double-pole single-throw solenoid including a solenoid coil having one end connected to said cathode and an opposite end connected to the second power terminal, a parallel RC network connected in series between said stop terminal and said thyristor gate for applying a trigger pulse to said gate when said actuator switch is moved to said off position, and circuit means including a transistor having a collector connected to one of said anode and cathode, and an emitter connected to the other of said anode and cathode, and also having a base connected to said solenoid coil to respond to transient current flow in said solenoid coil so as to render said transistor conductive for shunting said thyristor anode and cathode to prevent current flow through said thyristor in response to one of said trigger pulses applied to said gate alternate times said actuator is moved to said off position, said circuit means also connected in circuit with said thyristor for allowing a holding current to flow through said thyristor in response to one of said trigger pulses applied to said gate the other alternate times said actuator switch is moved to said off position, said circuit means also for allowing said holding current to increase to an energizing current which flows through said thyristor and said solenoid coil to energize said solenoid coil alternate times said actuator switch moves to said go position.

7. A motor control in accordance with claim 6 wherein said transistor collector is connected to said thyristor anode, said transistor emitter is connected to said thyristor cathode, and wherein said circuit means further comprises first resistance means having one end connected to the first power terminal and an opposite end connected to said thyristor anode and said transistor collector for allowing flow of said holding current through said thyristor, and for allowing flow of current through said transistor when said base responds to said transient current, a free wheeling diode connected across said solenoid coil and having an anode connected to the second power terminal and a cathode connected to said transistor base, and second resistance means having one end connected to said transistor base and the other end connected to said transistor emitter for reducing the gain of said transistor.

8. A vehicle comprising a direct current motor control including a direct current motor, a bank of series connected batteries, and switch means for electrically disconnecting and connecting said bank to the motor so that successive energizations of the motor are alternately from opposite ends of said battery bank, said switch means including alternate action solenoid drive circuit means adapted for connection to a DC source having first and second power terminals, said solenoid drive circuit means including actuator switch means including go and stop terminals, and an actuator switch connected to the first power terminal and selectively operable for alternately moving between a go position connecting said go terminal to the first power terminal, and an off position connecting said stop terminal to the first power terminal, first semiconductor switching means having a first terminal connected to said go terminal, and having a second terminal and a third terminal, a solenoid including a solenoid coil connected in series relation with said first semiconductor switching means between the first and second power terminals, first circuit means connected to and between said stop terminal and said third terminal for applying a trigger pulse to said third terminal when said actuator switch is moved to said off position, and second circuit means connected in circuit with said first semiconductor switching means and said solenoid coil for preventing current flow through said first semiconductor switching means in response to one of said trigger pulses alternate times said actuator is moved to said off position, and for allowing a holding current to flow though said first semiconductor switching means in response to one of said trigger pulses applied to said third terminal the other alternate times said actuator switch is moved to said off position, said second circuit means also for allowing said holding current to increase to an energizing current which flows through said first semiconductor switching means and said solenoid coil to energize said solenoid alternate times said actuator switch moves to said go position.

9. An alternate action solenoid drive circuit adapted for connection to a DC source having first and second power terminals, said circuit comprising actuator switch means including go and stop terminals, and an actuator switch connected to the first power terminal and selectively operable for alternately moving between a go position connecting said go terminal to the first power terminal, and an off position connecting said stop terminal to the first power terminal, first semiconductor switching means having a first terminal connected to said go terminal, and having a second terminal and a third terminal, a solenoid including a solenoid coil connected in series relation with said first semiconductor switching means between the first and second power terminals, first circuit means connected to and between said stop terminal and said third terminal for applying a trigger pulse to said third terminal when said actuator switch is moved to said off position, and second circuit means connected in circuit with said first semiconductor switching means and comprising second semiconductor switching means connected to said solenoid coil for responding to transient current flow in said solenoid coil so as to be rendered operative to prevent current flow through said first semiconductor switching means in response to one of said trigger pulses alternate times said actuator is moved to said off position.

10. An alternate action solenoid drive circuit adapted for connection to a DC source having first and second power terminals, said circuit comprising actuator switch means including go and stop terminals, and an actuator switch connected to the first power terminal and selectively operable for alternately moving between a go position connecting said go terminal to the first power terminal, and an off position connecting said stop terminal to the first power terminal, a thyristor having an anode connected to said go terminal, and a cathode and a gate, a solenoid including a solenoid coil connected in series relation with said thyristor between the first and second power terminals, first circuit means connected to and between said stop terminal and said gate for applying a trigger pulse to said gate when said actuator switch is moved to said off position, and second circuit means connected in circuit with said thyristor and said solenoid coil for preventing current flow through said thyristor in response to one of said trigger pulses alternate times said actuator is moved to said off position, and for allowing a holding current to flow through said thyristor in response to one of said trigger pulses applied to said gate the other alternate times said actuator switch is moved to said off position, said second circuit means also for allowing said holding current to increase to an energizing current which flows through said thyristor and said solenoid coil to energize said solenoid alternate times said actuator switch moves to said go position.

11. A circuit in accordance with claim 10 wherein said first circuit means comprises a parallel RC network connected in series between said stop terminal and said thyristor gate.

12. A circuit in accordance with claim 10 wherein said second circuit means comprises second semiconductor switching means connected to said solenoid coil for responding to transient current flow in said solenoid coil so as to be rendered operative to prevent current flow through said first semiconductor switching means in response to one of said trigger pulses said alternate times said actuator is moved to said off position.

13. A circuit in accordance with claim 10 wherein said second circuit means comprises first resistance means connected to said first power terminal and said thyristor for allowing flow of said holding current through said thyristor.

14. A circuit in accordance with claim 10 wherein said second circuit means comprises a transistor including a collector and an emitter each respectively connected to one of said first and second thyristor terminals, and also including a base connected to said solenoid coil for responding to transient current flow in said solenoid coil so as to render said transistor conductive for shunting said thyristor first and second terminals to prevent current flow through said thyristor in response to one of said trigger pulses said alternate times said actuator switch is moved to said off position.

15. A circuit in accordance with claim 14 wherein said second circuit means comprises first resistance means connected to said first power terminal and to said thyristor and said transistor for allowing flow of said holding current through said thyristor, and for allowing flow of current through said transistor when said base responds to said transient current flow to render said transistor conductive.

16. A circuit in accordance with claim 14 wherein said second circuit means comprises a free wheeling diode connected across said solenoid coil and having one of an anode and a cathode connected to said transistor base.

17. A circuit in accordance with claim 14 wherein said second circuit means comprises second resistance means connected in circuit with said transistor for reducing the gain of said transistor.

* * * * *